United States Patent
Yin et al.

(10) Patent No.: US 10,147,292 B2
(45) Date of Patent: Dec. 4, 2018

(54) TRAIN SMOKE AND FIRE ALARM COMMUNICATION METHOD BASED ON INDEPENDENT MODULES COMBINATION AND 3U CHASSIS STRUCTURE

(71) Applicant: CRRC QINGDAO SIFANG ROLLING STOCK RESEARCH INSTITUTE CO., LTD., Qingdao (CN)

(72) Inventors: Guorui Yin, Qingdao (CN); Xiangkai Xu, Qingdao (CN); Song Gao, Qingdao (CN); Puchun An, Qingdao (CN); Jiasheng Sun, Qingdao (CN); Zhen Zhang, Qingdao (CN)

(73) Assignee: CRRC QINGDAO SIFANG ROLLING STOCK RESEARCH INSTITUTE CO., LTD., Shandong (CN)

( * ) Notice: Subject to any disclaimer, the term of this patent is extended or adjusted under 35 U.S.C. 154(b) by 0 days.

(21) Appl. No.: 15/737,240

(22) PCT Filed: Sep. 18, 2016

(86) PCT No.: PCT/CN2016/099189
§ 371 (c)(1),
(2) Date: Dec. 15, 2017

(87) PCT Pub. No.: WO2017/143766
PCT Pub. Date: Aug. 31, 2017

(65) Prior Publication Data
US 2018/0174417 A1  Jun. 21, 2018

(30) Foreign Application Priority Data

Jul. 14, 2016 (CN) .......................... 2016 1 0555116
Jul. 14, 2016 (CN) .......................... 2016 1 0555328
Jul. 14, 2016 (CN) .................... 2016 2 0742954 U

(51) Int. Cl.
*G08B 17/10* (2006.01)
*H04L 12/40* (2006.01)
(Continued)

(52) U.S. Cl.
CPC .......... *G08B 17/10* (2013.01); *B61L 15/0036* (2013.01); *B61L 15/0072* (2013.01);
(Continued)

(58) Field of Classification Search
CPC .......... G08B 17/10; G08B 7/06; G08B 25/10; G08B 25/14; G08B 29/18; B61L 15/0036;
(Continued)

(56) References Cited

U.S. PATENT DOCUMENTS 3,925,763 A * 12/1975 Wadhwani ............. G08B 25/06
                                                                340/310.11
3,987,397 A * 10/1976 Belcher ............. H04N 7/17327
                                                                725/14
(Continued)

FOREIGN PATENT DOCUMENTS

CN         201364635 Y        12/2009
CN         202916941 U         5/2013
(Continued)

OTHER PUBLICATIONS

Yang, Dongjun et al., "Integrated Supervisory Control System for Power Supply and Safety of Express Freight Train" Symposia of Express Freight Train Braking Technology Seminar of Vehicle Committee of China Railway Society; Oct. 31, 2015; pp. 200-201.
(Continued)

*Primary Examiner* — An T Nguyen
(74) *Attorney, Agent, or Firm* — J.C. Patents

(57) ABSTRACT

The present application relates to a train smoke and fire alarm communication method based on independent modules combination and a 3U chassis structure. By externally connecting a carriage number connector X4 of an IO board to an address line to identify a carriage number, and invoking a detector configuration; acquiring temperature information and smoke concentration information by detectors and transmitting the same to a CPU board to be processed; by the CPU board, determining the acquired information, and outputting alarm information, and transmitting the alarm information to an HMI display screen in a cab; interrupting signals output between the IO board and a train safety loop, and transmitting the alarm information to the HMI display screen in the cab, and lightening a red alarm indicator on the DISP board; and by a DS board, Enet board and wireless board, collecting, storing and uploading the information.

6 Claims, 5 Drawing Sheets

(51) Int. Cl.
| | | |
|---|---|---|
| H04L 29/12 | (2006.01) | |
| G08B 7/06 | (2006.01) | |
| G08B 25/10 | (2006.01) | |
| G08B 25/14 | (2006.01) | |
| G08B 29/18 | (2006.01) | |
| B61L 15/00 | (2006.01) | |
| B61L 23/00 | (2006.01) | |
| H04W 84/18 | (2009.01) | |

(52) U.S. Cl.
CPC ........... *B61L 15/0081* (2013.01); *B61L 23/00* (2013.01); *G08B 7/06* (2013.01); *G08B 25/10* (2013.01); *G08B 25/14* (2013.01); *G08B 29/18* (2013.01); *H04L 12/40* (2013.01); *H04L 61/2069* (2013.01); *H04L 2012/40215* (2013.01); *H04W 84/18* (2013.01)

(58) Field of Classification Search
CPC .. B61L 15/0072; B61L 15/0081; B61L 23/00; H04L 12/40; H04L 61/2069; H04L 2012/40215; H04W 84/18
See application file for complete search history.

(56) References Cited

U.S. PATENT DOCUMENTS

| | | | | |
|---|---|---|---|---|
| 4,097,690 | A | * | 6/1978 | Kuntz .................... H04M 11/04 379/250 |
| 2018/0174417 | A1 | * | 6/2018 | Yin ......................... G08B 17/10 |

FOREIGN PATENT DOCUMENTS

| | | |
|---|---|---|
| CN | 202916942 U | 5/2013 |
| CN | 103632484 A | 3/2014 |
| CN | 104091404 A | 10/2014 |
| CN | 104143246 A | 11/2014 |
| CN | 204348016 U | 5/2015 |
| KR | 10-1064746 B1 | 9/2011 |

OTHER PUBLICATIONS

International Search Report of corresponding International PCT Application No. PCT/CN2016/099189, dated Apr. 20, 2017.

* cited by examiner

TRAIN SMOKE AND FIRE ALARM COMMUNICATION METHOD BASED ON INDEPENDENT MODULES COMBINATION AND 3U CHASSIS STRUCTURE

CROSS-REFERENCE TO RELATED APPLICATION

This application is a national phase application of international application No. PCT/CN2016/099189 filed on Sep. 18, 2016, which in turn claims the priority benefits of Chinese application No. 201610555116.0, filed on Jul. 14, 2016, Chinese application No. 201620742954.4, filed on Jul. 14, 2016, and Chinese application No. 201610555328.9, filed on Jul. 14, 2016. The contents of these prior applications are hereby incorporated by reference in their entireties.

TECHNICAL FIELD

The present application relates to the technical field of fire alarm of railway vehicles, and in particular to a train smoke and fire alarm communication method based on independent modules combination and a 3U (3 Unit) chassis structure.

BACKGROUND OF THE INVENTION

A China Railway High-speed (CRH) train, as a very complicated passenger vehicle in high-speed motion state, is equipped with electrical devices with different functions, with lots of wires and cables being deployed therein. Due to the small transportation environment space, dense population and difficulty for evacuation and rescue, great casualties and economic losses will be caused if it is failed to discover fire in time and take corresponding measures when fire happens. Since there are too many places to be monitored in a train and the number, positions and functions of detectors required by trains of various types are diversified, the existing smoke and fire alarm communication systems and methods already cannot satisfy the requirements for the high-speed development of trains. Therefore, it is very necessary to invent an intelligent smoke and fire alarm communication method which is suitable for CRH trains and can satisfy the function requirements and interface requirements of CRH trains of various types.

In terms of mechanical interfaces, the conventional smoke and fire alarm devices are mostly of an integrated structure, and are generally mounted at positions with a narrow space on trains due to their single function and small size. Moreover, there are various mechanical interfaces for trains of various types. Once a device breaks down, the whole device needs to be disassembled and returned to the factory, so that it is very inconvenient for inspection and maintenance of the device.

In terms of electrical interfaces, the conventional smoke and fire alarm devices generally have RS485 communication interfaces or MVB (Multifunction Vehicle Bus) communication interfaces or hard-wired interfaces applicable to trains of this type, so that the features of various networks in the trains cannot be better combined to realize the redundancy of interfaces and improve the safety of the system.

In terms of functions, once the conventional smoke and fire alarm devices are designed, the functions thereof are fixed, and it is very difficult to flexibly add or cancel functional modules according to the requirements of different trains. Moreover, once a software failure occurs in the device, the whole system comes into a "halted" state, and it is very difficult to determine the cause for the failure.

In terms of alarm communication, the CAN (Control Area Network) communication is a common communication mode for train systems; and the devices are generally suspended on a CAN bus, and the devices are identified by configuring device addresses through software or hardware. However, since the number of detectors in a train is changeable as desired and the number of probes varies in trains of various types and in different carriages, the existing smoke and fire alarm devices have many limitations in terms of the number of detectors and the configuration flexibility.

Among the existing smoke and fire alarm methods, Chinese Patent CN10363484A has disclosed a train smoke and fire alarm system and method based on a wireless sensor network. Information about each position is acquired by a number of smoke and fire alarm nodes distributed within a train body, and the information is transmitted to a gateway node in a wireless routing manner. The gateway node collects and classifies the information data uploaded by the smoke and fire alarm nodes, and then uploads the information data to a train network control system in a wired manner. The train network control system processes the information and gives an alarm prompt. In this alarm method, it is only indicated that the wireless routing manner is adopted between the alarm nodes and the network node. A plurality of detectors are suspended on a common communication bus. Since the number of detectors in trains is changeable as desired and the number of probes varies in trains of various types and in different carriages, if communication is to be performed between the plurality of nodes via a single bus, it is required to encode the addresses of the detectors on software or hardware, that is, it is required to set an address for each detector on the bus, so as to identify the corresponding detectors. However, this will limit the case where there are lots of detectors and the detectors are required to be configured flexibly.

For another example, Chinese Patent CN204348016U has disclosed a train smoke and fire alarm device, wherein a smoke and fire controller of the smoke and fire alarm device includes a main controller, a failure detection module, a buzzer, an indicator, a display screen and a communication module; and the main controller is connected to the failure detection module, the buzzer, the indicator, the display screen and the communication module through internal buses, respectively. However, with regard to the alarm device, the communication mode of the internal buses is not disclosed, and the interfaces and specific connection modes between the main controller and the modules are also not specifically disclosed. Thus, the universality of interfaces and the reliability of communication of the alarm device are not exhibited.

For example, Chinese Patent CN104143246A has disclosed a smoke and fire alarm system for a CRH train, wherein a microprocessor of this alarm system has two CAN bus interfaces, and there are several smoke detectors connected in series through CAN buses. The data transmission is two-path transmission, and different CAN boxes are used. One path of data is transmitted to a CAN bus transceiver of a controller, while another path of data is transmitted to another CAN bus transceiver of the controller in an opposite direction. After one CAN bus is disconnected, the other CAN bus can still work, so that the normal transmission of data is ensured. In other words, with regard to this alarm system, since a plurality of detectors are suspended on one CAN bus, it is required to encode the addresses of the detectors on software or hardware. That is, it is required to set an address for each detector on the bus, so as to identify the corresponding detectors. However, this will limit the case where there are lots of detectors and the detectors are required to be configured flexibly.

For another example, Chinese Patent CN201364635Y has disclosed a fire alarm control system for a high-speed train, wherein a CAN bus transceiver module of this control system connects each detector to a controller. Each connection is realized by an independent CAN bus, and each detector and the controller have two addresses. In other words, although the connection between the controller and a detector and between a detector and another detector is realized by an independent CAN bus, it is still required to set an independent address for each detector to identify the corresponding detectors. As a result, the configuration flexibility is influenced.

SUMMARY OF THE PRESENT INVENTION

An objective of the present application is to provide a train smoke and fire alarm communication method based on independent modules combination and a 3U chassis structure.

The present application employs the following technical solution. A train smoke and fire alarm communication method based on independent modules combination and a 3U chassis structure is provided, comprising the following steps of:

externally connecting a carriage number connector X4 of an IO (input and output) board to an address line to identify a carriage number, and invoking a detector configuration;

acquiring, by detectors, temperature information and smoke concentration information in an ambient environment of each detector, and transmitting the acquired temperature information and smoke concentration information to a CPU (Central Processing Unit) board to be processed;

by the CPU board, determining the acquired temperature information and smoke concentration information, outputting alarm information when the temperature or the concentration of smoke exceeds a set threshold, and transmitting the alarm information to an HMI (Human Machine Interface) display screen in a cab via a train network;

after the alarm, interrupting signals output between the IO board and a train safety loop, and transmitting the alarm information to the HMI display screen in the cab, and lightening a red alarm indicator on the DISP (Directory Information Shadowing Protocol) board corresponding to the detector giving the alarm; and by a DS (Data Storage) board, collecting and storing the temperature information, the smoke concentration information and the alarm information; by an Enet (Ethernet) board, collecting the temperature information, the smoke concentration information and the alarm information, as well as the communication state of each board and storing the states, and connecting the information on a switch by an Ethernet; and, by a wireless board, uploading the information to a cloud server.

Wherein, the detectors include CAN interface detectors or FSK (Frequency-shift Keying) interface detectors, and the CAN interface detectors or FSK interface detectors transmit the acquired temperature information and smoke concentration information to the CPU board, through a CAN board or an FSK board, respectively, to be processed.

The communication between the CAN interface detectors and the CAN board and the communication between the FSK interface detectors and the FSK board are realized in a same communication mode. There are two communication mechanisms, i.e., a group transmission-response mechanism and a roll call-response mechanism.

The communication mechanism between the detectors and the CAN board or the FSK board is a group transmission-response mechanism. The group transmission-response mechanism comprises two processes, i.e., group command transmission and group command response. The process of transmitting a group command from the CAN board to the detectors FSD (Fire Smoke Detector) adopts a command frame address increment algorithm. The CAN board transmits a command frame via its port CAN#0, and a first detector FSD1 receives the command frame from the CAN board and forwards. When forwarding, the first detector FSD1 performs address increment processing on the command frame address to calculate a new command frame address, and transmits this new command frame address to a next detector FSD. In the group command response process, the $n^{th}$ detector FSDn transmits and forwards a response slave command frame address of the detector at this node via its port CAN#1, and receives response frame IDs from other detectors via its port CAN#0. When forwarding the response slave command frame address of the detector at this node, the $n^{th}$ detector FSDn performs address increment processing on the slave command frame address to calculates a new slave command frame address, and transmits this new slave command frame address to a previous detector FSD.

The communication mechanism between the detectors and the CAN board or the FSK board is a roll call-response mechanism. The roll call-response mechanism comprises two processes, i.e., roll call command transmission and roll call command response. The process of transmitting a command from the CAN board to the detectors FSD, i.e. slave nodes, adopts a command frame address decrement algorithm. The CAN board transmits a command frame via its port CAN#0, and a first detector FSD1 receives the command frame from the CAN board and forwards. When forwarding, the first detector FSD1 performs address decrement processing on the command frame address to calculate a new command frame address, and transmits this new command frame address to a next detector FSD. During the roll call command response, a command frame address of a port CAN#1 of a $n^{th}$ detector FSDn conforms to a command frame address of a roll call command, and only the $n^{th}$ detector FSDn responds to the roll call command. When forwarding a response slave command frame at this node, the $n^{th}$ detector FSDn performs address increment processing on the slave command frame address to calculate a new slave command frame address and feeds this new slave command frame address back to a previous detector FSD.

A smoke and fire alarm device used in this communication method comprises a power supply board, an IO board, a CPU board, a CAN board, a FSK board, a DS board, a DISP board, an Enet board, a liquid crystal touch screen and a wireless board. The boards are communicated with each other through a backplane bus.

Both the CAN board and the detectors FSD are provided with a port CAN#0 and a port CAN#1, and both the port CAN#0 and the port CAN#1 have a function of receiving and transmitting a frame address. The port CAN#0 of the CAN board is connected to the port CAN#1 of a first detector FSD1; the port CAN#0 of the first detector FSD1 is connected to the port CAN#1 of a next detector FSD; the port CAN#0 of the next detector FSD is connected to the port CAN#1 of a $n^{th}$ detector FSDn; and the port CAN#0 of the $n^{th}$ detector FSDn is connected to the port CAN#1 of the CAN board. The connections between the CAN board and its neighboring detectors FSD and the connections between adjacent detectors FSD are realized by independent CAN buses. A data forwarding module is provided inside each detector FSD. The data forwarding module modifies and forwards a received command frame address.

Compared with the prior art, the present application has the following beneficial effects:

1) the train smoke and fire alarm device is modularized where the boards are independently mounted within a 3U chassis, so that the layout is compact, and the boards may be configured flexibly to realize module-level inspection and maintenance;

2) in this train smoke and fire alarm device, the electrical interfaces of the boards are compatible with the existing train network interfaces, so that the inheritance of the device is ensured and the compatibility of the device with multiple types of trains is improved;

3) during the communication, the CAN board performs the increment or decrement algorithm on the CAN frame addresses of the detectors through the forwarding mechanism of the detectors to distinguish between the CAN frame addresses of the detectors, and in this way, the addresses of response frames are different when the detectors receives CAN frames with different addresses, so that the process of encoding the addresses of the detectors is omitted, and the configurability of the system is improved; and 4) when the CAN board is communicated with the detectors, two paths of CAN communication are formed in two directions of a CAN loop, so that the redundancy function is realized, and the number of wires is reduced in comparison with the existing mutual redundancy mode using two CAN buses.

DETAILED DESCRIPTION OF THE INVENTION

In order to make the objectives, technical solutions and advantages of the embodiments of the present application clearer, the technical solutions in the embodiments of the present application will be described clearly and completely with reference to the accompanying drawings in the embodiments of the present application.

Embodiment 1

The present application discloses a train smoke and fire alarm communication method based on independent modules combination and a 3U chassis structure. A smoke and fire alarm device used in the communication method comprises a plurality of independent boards. The independent boards may be disassembled or assembled separately, and the number of these independent boards may be increased or reduced according to the actual needs, so that it is advantageous for the maintenance and upgrade of the device.

Figure 1:
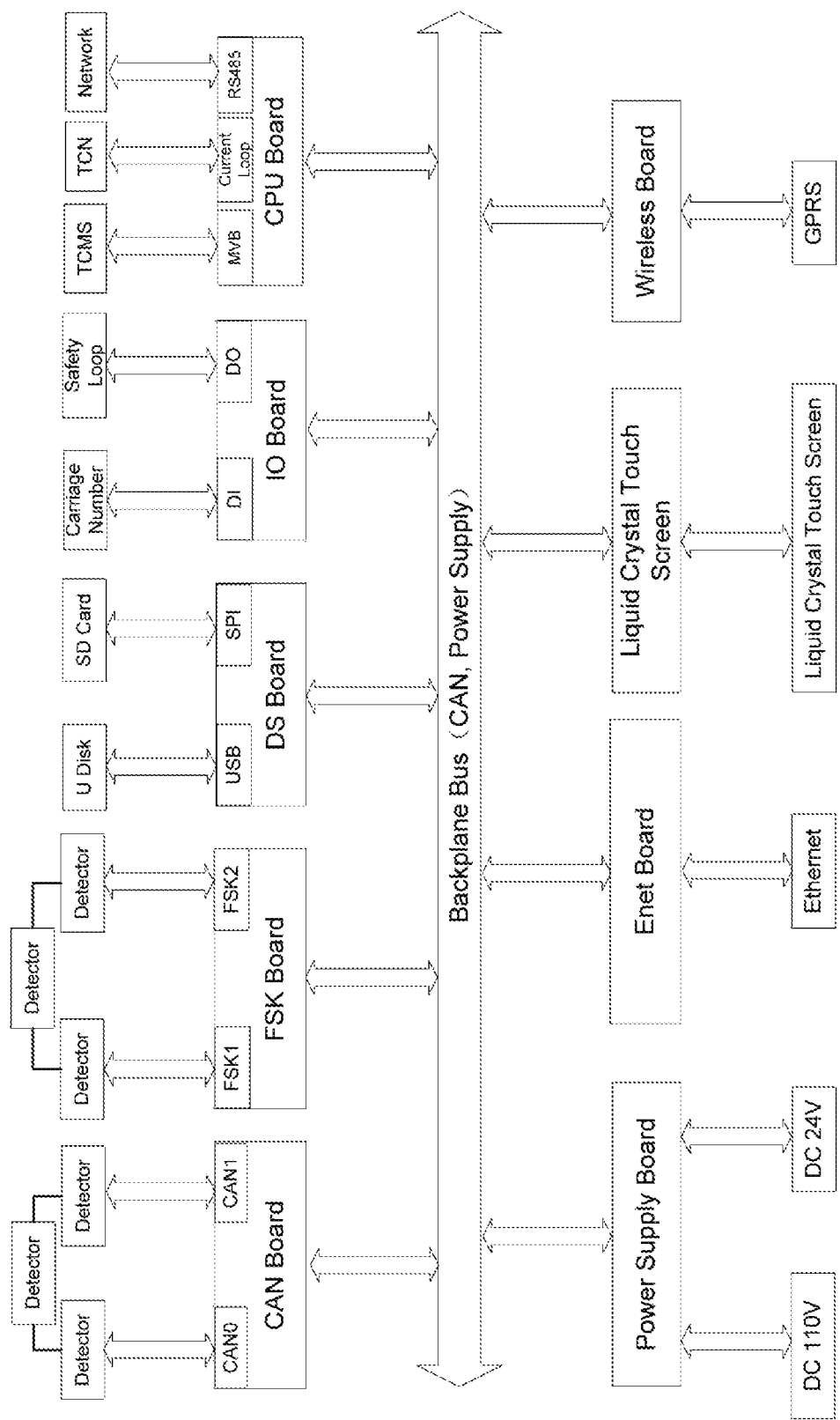
FIG. 1 is a structural diagram of a smoke and fire alarm device according to the present application.

Referring to FIG. 1, functionally, the independent boards comprises: a power supply board, an IO board, a CPU board, a CAN board, an FSK board, a DS board, a DISP board, an Enet board, a liquid crystal touch screen and a wireless board. The boards are electrically connected via a backplane bus. The power supply board supplies power to the boards, detectors and the liquid crystal touch screen. A digital quantity input and output module is provided in the IO board. The CAN board and the FSK board are connected to the detectors respectively to acquire temperature information and smoke concentration information, and transmit the temperature information and the smoke concentration information to the CPU board to be processed. The CPU board receives the temperature information and the smoke concentration information, then processes and determines, and outputs alarm information. Red alarm indicators, yellow failure indicators and a reset button are provided on a panel of the DISP board. The red alarm indicators receive and display the alarm information, and the yellow failure indicators receive and display failure information. The red alarm indicators and the yellow failure indicators are in one-to-one correspondence to the detectors. The DS board receives and stores the temperature information, the smoke concentration information, the alarm information and the failure information. The Enet board and the wireless board receive the temperature information, the smoke concentration information, the alarm information, the failure information, the communication state between the boards, and the storage state of the DS board, and upload the information to a train Ethernet and a train service terminal.

The structures and functions of the boards are as follows.

A voltage conversion module is provided inside the power supply board, for converting DC110V/DC24V direct current into DC24V/DC12V/DC5V direct current. The power supply board is provided with two connectors, i.e., a power input connector X1 and a power output connector X2, respectively. The power input connector X1 may be connected to a DC110V power supply and a DC24V power supply, and is compatible with different voltage outputs of general wagons and CRH trains. The power output connector X2 outputs DC24V, DC12V and DC 5V voltages; wherein, the DC24V is connected to an external detector via the backplane bus and is used for supplying power to the external detector; the DC12V is connected to the liquid crystal touch screen via the backplane bus and is used for supplying power to the liquid crystal touch screen; and, the DC5V is connected to each board via the backplane bus and is used for supplying power to the boards.

The power input connector X1 is a three-pin connector. If the input voltage is DC110V, the pins of the power input connector X1 are as defined in Table 1:

TABLE 1

| Pins of the power input connector X1 | | | |
|---|---|---|---|
| Pin Number | 1 | 2 | 3 |
| Signal Name | 110+ | NC | 110− |

The power output connector X2 is a three-pin connector. If the input voltage is DC24V, the pins of the power output connector X2 are as defined in Table 2:

TABLE 2

Pins of the power output connector X2

| Pin Number | 1 | 2 | 3 |
|---|---|---|---|
| Signal Name | DC24V+ | NC | DC24V− |

A digital quantity input and output module for inputting and outputting digital quantities of the system is provided inside the IO board. The IO board is provided with two connectors, i.e., a safety loop connector X3 and a carriage number connector X4, respectively.

The safety loop connector X3 is a five-pin connector, whose pins are as defined in Table 3:

TABLE 3

Pins of the safety loop connector X3

| Pin Number | 1 | 2 | 3 | 4 | 5 |
|---|---|---|---|---|---|
| Signal Name | D01 | D02 | COM terminal | NC | NC |

Wherein, the D01 terminal of the safety loop connector X3 is a normally open contact output, the D02 terminal is a normally closed contact output, the COM terminal is a common terminal, and the NC terminal is suspended. The safety loop connector X3 is connected to a train safety loop. When the IO board receives the alarm information determined by the CPU board, the normally closed contact of the safety loop connector 3 is disconnected, and the output of signals to the train safety loop is thus disconnected. After the train safety loop is disconnected, the alarm information as redundant information is transmitted to an HMI display screen in a cab to prompt the cab.

The carriage number connector X4 is a seven-pin connector, whose pins are as defined in Table 4:

TABLE 4

Pins of the carriage number connector X4

| | Pin Number | | | | | | |
|---|---|---|---|---|---|---|---|
| | 1 | 2 | 3 | 4 | 5 | 6 | 7 |
| Signal Name | ADD0 | ADD1 | ADD2 | ADD3 | ADD4 | GND | GND |

Wherein, the terminals ADD0 to ADD4 are used for identifying the carriage number, and the GND terminal is a ground terminal. The carriage number connector X4 is connected to a carriage address line, and at most supports the encoding of a 32-byte train address. The requirement of at most 16-byte marshaling for all existing train types is satisfied.

During the encoding of a train address, binary encoding is performed according to the loop wire grounding mode of the connector. When the terminals ADD0 to ADD4 of the carriage number connector X4 and the GND terminal are looped, it is 0, and when the terminals ADD0 to ADD4 are suspended, it is 1. During the identification of the carriage number by the terminals ADD0 to ADD4, each address plug must use two loop wires, otherwise, the address will be identified wrongly. This setting may prevent a bus failure resulted from address overlapping. The carriage numbers are as defined in Table 5:

TABLE 5

Address codes of the carriage numbers

| Carriage Number | ADD0 | ADD1 | ADD2 | ADD3 | ADD4 |
|---|---|---|---|---|---|
| 1 | 0 | 1 | 1 | 1 | 0 |
| 2 | 0 | 1 | 1 | 0 | 1 |
| 3 | 0 | 1 | 0 | 1 | 1 |
| 4 | 1 | 1 | 1 | 0 | 0 |
| 5 | 1 | 0 | 1 | 1 | 0 |
| 6 | 1 | 0 | 1 | 0 | 1 |
| 7 | 1 | 1 | 0 | 1 | 0 |
| 8 | 1 | 1 | 0 | 0 | 1 |

Both the CAN board and the FSK board are communicated with the detectors to acquire temperature information and smoke concentration information, and transmit, via the backplane bus, the acquired information to the CPU board to be processed. The CAN board acquires state information of CAN interface detectors, and the FSK board acquires state information of FSK interface detectors. Meanwhile, the CAN board and the FSK board transmit the acquired information of the detectors to the DS board. Both the CAN board and the FSK board are communicated with the detectors in a loop redundancy manner to automatically identify the position of the detectors and to diagnose the state of the detectors.

The CAN board and the FSK board are communicated with the detectors through detector connectors X5. By taking the CAN board as example, the detector connector X5 includes a port CAN#0 and a port CAN#1, the detectors include a first detector FSD1, a second detector FSD1 . . . and a $n^{th}$ detector FSDn, and each detector is provided with a port CAN#0 and a port CAN#1.

The port CAN#0 of the CAN board is connected to the port CAN#1 of the first detector FSD1; the port CAN#0 of the first detector FSD1 is connected to the port CAN#1 of a next detector FSD; the port CAN#0 of the next detector FSD is connected to the port CAN#1 of the $n^{th}$ detector FSDn; and, the port CAN#0 of the $n^{th}$ detector FSDn is connected to the port CAN#1 of the CAN board. The connections between the CAN board and its neighboring detectors FSD and the connections between adjacent detectors FSD are realized by independent CAN buses. A data forwarding module is provided inside each detector FSD. The data forwarding module modifies and forwards the received command frame address.

The CPU board is communicated with the CAN board and the DS board via the backplane bus. The CPU board processes and determines the acquired information of the detectors, and when the temperature or the smoke concentration exceeds a set threshold, outputs alarm information. The CPU board is provided with an MVB interface, a current loop and an RS485 interface. The CPU board is connected to a train monitor system (TCMS) Train Control and Management System through the MVB interface, is connected to a train communication network (TCN) through the current loop, and is connected to a train network through the RS485 interface. The CPU board uploads the alarm information and downloads train configuration information (e.g., speed, carriage number, time, etc.) through the above mentioned interfaces. The train network transmits the alarm information to the HMI display screen in the cab to prompt the cab.

The DS board is communicated with the CAN board, the FSK board and the CPU board via the backplane bus. The DS board receives the temperature information and the smoke concentration information acquired by the detectors, receives the alarm information transmitted by the CPU board, and stores the information. The DC board is provided with a USB (Universal Serial Bus) interface and an SPI (Serial Peripheral Interface) interface. The DC board downloads the stored information into storage devices such as a USB flash disk through the USB interface, and downloads the stored information into an SD (Secure Digital) card through the SPI interface for subsequent information analysis after fire.

The DISP board is communicated with the CAN board, the FSK board and the CPU board via the backplane bus. Red alarm indicators, yellow failure indicators and a reset button are provided on a panel of the DISP board. Wherein, the red alarm indicators are in one-to-one correspondence to the detectors. When a detector detects that the temperature or the smoke concentration exceeds the set threshold, the red alarm indicator corresponding to this detector is lightened to display the alarm information; and, when a failure occurs in a detector, the yellow failure indicator corresponding to this detector is lightened. By pressing down the reset button, all the red alarm indicators and the yellow failure indicators go out; and the red alarm indicators and the yellow failure indicators will be lightened again when a fire alarm or a failure occurs again.

The Enet board is communicated with the above boards via the backplane bus. The Enet board acquires all the temperature information, smoke concentration information, fire alarm state and failure state, the communication state between the boards, and storage state information of the DS board. Meanwhile, the Enet board is communicated with a switch via a train Ethernet network. During the overall maintenance, by simply connecting a single PC to any switch, a user can access to all smoke and fire alarm devices in the whole train so as to examine whether there is a failure, and can also download the information recorded in the DS board of any smoke and fire alarm device and refresh the software of the smoke and fire alarm device arbitrarily.

The wireless board is communicated with the above boards via the backplane bus. The wireless board acquires all information about the temperature, the smoke concentration, the fire alarm state, the failure state, the communication state and the storage state information. The wireless board is externally connected to a wireless data acquisition system GPRS by which the wireless board uploads the above information to a cloud server, so that a service terminal is allowed to comprehensively monitor the information and it is convenient for the user to view the information remotely.

The liquid crystal touch screen is communicated with the above boards via the backplane bus. The liquid crystal touch screen collects information from the boards and then displays the state of the smoke and fire alarm device in real time. By the liquid crystal touch screen, parameters such as the time of the smoke and fire alarm device may be set, resetting and silencing operations may be performed, and the historical records may be viewed.

The smoke and fire alarm communication method comprises the following steps.

The carriage number connector X4 of the IO board is externally connected to the address line to identify the carriage number, and a detector configuration is invoked according to the carriage number. The configuration comprises the number of the detectors, the distribution position of the detectors, the alarm temperature threshold of the detectors, etc.

Temperature information and smoke concentration information in an ambient environment of each detector are acquired by the CAN interface detectors or FSK interface detectors, and the acquired information is transmitted, via the backplane bus, to the CPU board to be processed.

The CPU board makes a determination according to the acquired information, and when the temperature or the smoke concentration exceeds the set threshold, outputs alarm information. The CPU board also transmits the alarm information to the train network through the MVB interface, the current loop and the RS485 interface. Then, the alarm information is transmitted to the HMI display screen in the cab through the train network to prompt the cab.

The DS board is activated to collect the temperature information and smoke concentration information acquired by the CAN board and the FSK board, and acquire the alarm information from the CPU board and store the information for subsequent information download and analysis.

After the IO board receives the alarm information determined by the CPU board, the normally closed contact of the safety loop connector 3 is disconnected, and the output of signals to the train safety loop is thus disconnected. After the train safety loop is disconnected, the alarm information as redundant information is transmitted to the HMI display screen in the cab to prompt the cab.

After the DISP board receives the alarm information, the red alarm indicator on the panel of the DISP board corresponding to the detector giving the alarm is lightened. Similarly, when a failure occurs in a detector, the yellow failure indicator corresponding to the faulted detector is lightened to prompt the failure information. After the alarm and failure information is relieved, the reset button is pressed down, and the red alarm indicators and the yellow failure indicators go out.

The Enet board acquires all information about the temperature, the smoke concentration, the fire alarm state, the failure state, the communication state and the storage state of the system, and suspends the information on the switch by the train Ethernet network for ease of inquiry.

The wireless board uploads the information to the cloud server through the wireless data acquisition system GPRS so that it is convenient for view the information remotely. The system information acquired through the backplane bus is displayed on the liquid crystal touch screen, and the system state is displayed in real time.

In the present application, the CAN board is communicated with the detectors via a CAN communication network, wherein the CAN board acts as a master network node in the CAN communication network, and the detectors act as slave network nodes in the CAN communication network.

In the smoke and fire alarm device of the present application, the connections between the CAN board and the plurality of detectors are realized by CAN buses. In other words, the connections between the CAN board and its neighboring detectors and the connections between adjacent detectors are realized by independent CAN buses. The data transmission and feedback between the plurality of detectors is realized by a data forwarding mechanism.

As shown in FIGS. 2 to 5, the CAN board acts as a fire controller FSDCU (Fire Smoke Detector Control Unit), and the plurality of detectors are the first detector FSD1, the second detector FSD2 . . . and the $n^{th}$ detector FSDn, respectively. Each of the fire controller FSDCU and the detectors FSD is provided with two ports, i.e., a port CAN#0 and a port CAN#1. Both the port CAN#0 and the port CAN#1 may be used to receive and transmit data. A data forwarding module is provided inside each of the detectors, and the data forwarding module can perform a data logic operation on the received command frame address and forward the command frame address.

The connections of the fire controller FSDCU and the detectors FSD are realized specifically as follows: the port CAN#0 of the fire controller FSDCU is connected to the port CAN#1 of the first detector FSD1; the port CAN#0 of the first detector FSD1 is connected to the port CAN#1 of the second detector FSD2; the port CAN#0 of the second detector FSD2 is connected to . . . , by such analogy, the port CAN#0 of the $(n-1)^{th}$ detector FSD(n−1) is connected to the port CAN#1 of the $n^{th}$ detector FSDn; and, the port CAN#0 of the $n^{th}$ detector FSDn is connected to the port CAN#1 of the fire controller FSDCU.

In the communication method, there are two communication mechanisms for the commands from the CAN board acting as the fire controller FSDCU to each detector: a group transmission-response mechanism and a roll call-response mechanism.

The group transmission-response mechanism comprises two processes, i.e., group command transmission and group command response. The group command transmission and the group command response are one-to-many commands After the CAN board acting as the fire controller FSDCU sends a command, all detectors FSD respond to the command from the fire controller FSDCU, and meanwhile receive and forward response command frames from other detectors FSD.

The specific working process of the group transmission-response mechanism is as follows.

(1) The working process of the group command transmission is as follows: referring to FIG. 2, the fire controller FSDCU as a master device of the CAN network sends a command frame ID=COM_Frame_ID via its port CAN#0; and, after the port CAN#1 of the first detector FSD1 receives the command frame ID=COM_Frame_ID from the fire controller FSDCU, the command frame address is processed according to the following formula (1) by the data forwarding module in the first detector FSD1:

$$TX\_COM\_Frame\_ID=COM\_Frame\_ID+1 \quad \text{Formula (1)}$$

where the COM_Frame_ID denotes the command frame address transmitted by the fire controller FSDCU, and the TX_COM_Frame_ID denotes the command frame address forwarded by the first detector FSD1.

Address increment is performed on the command frame address of the fire controller FSDCU in accordance with the formula (1) to calculate the new command frame address TX_COM_Frame_ID, and the new command frame address TX_COM_Frame_ID is transmitted to the port CAN#1 of the second detector FSD2 through the port CAN#0 of the first detector FSD1. Similarly, the data forwarding module in the second detector FSD2 performs address increment on the command frame address in accordance with the formula (1) to calculate a new command frame address, and then transmits this new command frame address to a next detector, by such analogy, until the port CAN#0 of the $n^{th}$ detector FSDn transmits the corresponding command frame address to the port CAN#1 of the fire controller FSDCU. The fire controller FSDCU selects to respond or not respond to the corresponding command frame address according to different values of the COM_Frame_ID.

Figure 2:
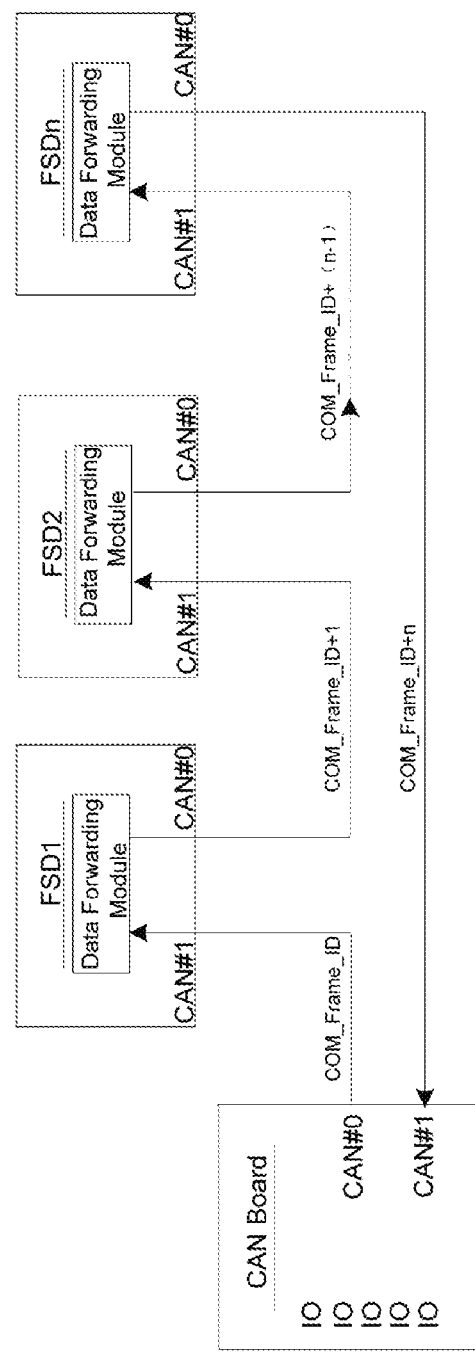
FIG. 2 is a schematic diagram of a group command transmission process by a CAN board, according to the present application.

With reference to FIG. 2, during the group command transmission, the process of transmitting a group command from the CAN board to the detectors FSD adopts a command frame address increment algorithm. The CAN board transmits a command frame via its port CAN#0, and the first detector FSD1 receives the command frame from the CAN board and then forwards. During forwarding, the first detector FSD1 performs address increment on the command frame address to calculate a new command frame address, and then transmits this new command frame address to the next detector FSD.

(2) The working process of the group command response is as follows.

Figure 3:
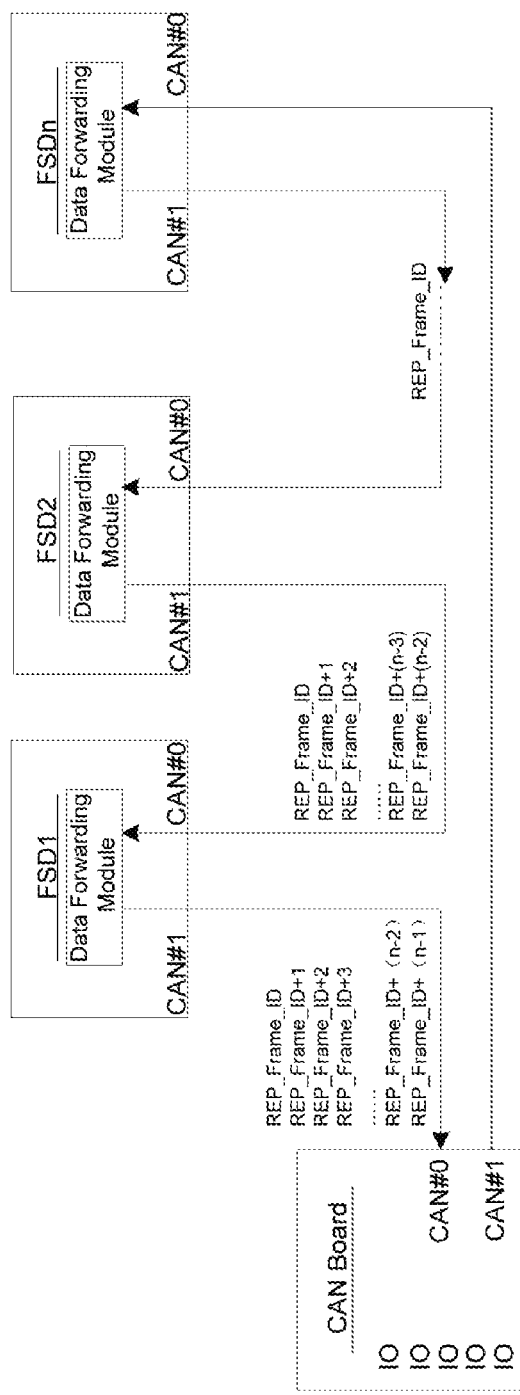
FIG. 3 is a schematic diagram of a group command response process by the CAN board, according to the present application.

Referring to FIG. 3, in the process of forwarding the command frame address of the group command, such as after the port CAN#1 of the first detector FSD1 receives the command frame ID=COM_Frame_ID transmitted by the port CAN#0 of the fire controller FSDCU, on one hand, this command frame needs to be forwarded to the second detector FSD2 connected to this node, through the port CAN#0 of the first detector FSD1, i.e., the above group command transmission process; on the other hand, in response to the command frame ID=COM_Frame_ID, a slave command fame address at this node is transmitted through the port CAN#1 of the first detector FSD1, and at the same time, a response frame ID=REP_Frame_ID from the port CAN#1 of the second detector FSD2 is received through the port CAN#0 of the first detector FSD1. Wherein, the slave command frame ID is calculated by the following formula (2):

$$TX\_REP\_Frame\_ID=REP\_Frame\_ID+1 \quad \text{Formula (2)}$$

where the REP_Frame_ID denotes the response frame ID received, by the first detector FSD1, from other slave nodes in response to the master node, and the TX_REP_Frame_ID denotes the response slave command frame address transmitted or forwarded to the fire controller FSDCU by the first detector FSD1 through the port CAN#1.

Similarly, in accordance with the above principle, the $n^{th}$ detector FSDn transmits and forwards the response slave command frame address at this node through its port CAN#1, and receives response frame IDs from other slave nodes through its port CAN#0. The received response frame IDs also include the response frame from the port CAN#1 of the fire controller FSDCU.

With reference to FIG. 3, in the group command response process, the $n^{th}$ detector FSDn transmits and forwards the response slave command frame address from the detector at this node through its port CAN#1, and receives response frame IDs from other detectors through its CAN#0; and, when forwarding the response slave command frame address from the detector at this node, the $n^{th}$ detector FSDn performs address increment on the slave frame address to calculate a new slave command frame address, and then transmits this new slave command frame address to a previous detector FSD.

The second command transmission way between the CAN board and the detectors is a roll call-response mechanism. The roll call-response mechanism comprises two processes, i.e., roll call command transmission and roll call response. The roll call command transmission and the roll call response are one-to-one commands. The CAN board acting as the fire controller FSDCU contains address information of the detectors FSD. After the CAN board acting as the fire controller FSDCU sends a roll call command, only a detector FSD having a roll call command conforming to the address of this node responds to this roll call command, and feeds information about a node making a response back to the CAN board.

The specific working process of the roll call-response mechanism is as follows.

(1) The working process of the roll call command transmission is as follows.

Figure 4:
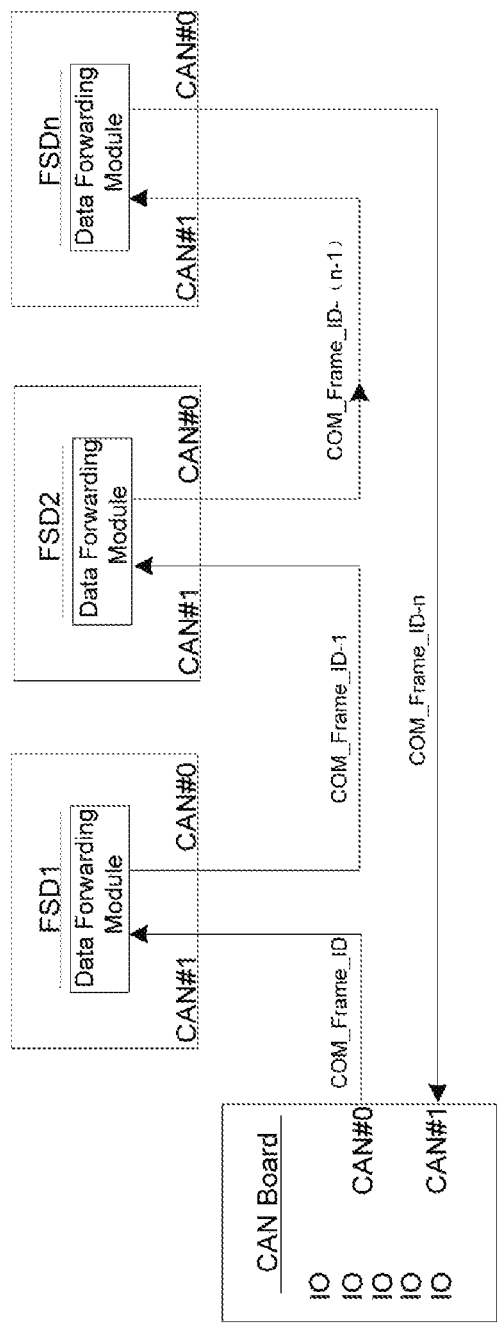
FIG. 4 is a schematic diagram of a roll call command transmission process by the CAN board, according to the present application.

Referring to FIG. 4, the fire controller FSDCU acting as a master CAN network device sends a command frame ID=COM_Frame_ID via its port CAN#0; and, after the port CAN#1 of the first detector FSD1 receives the command frame ID=COM_Frame_ID from the fire controller FSDCU, the command frame address is processed according to the following formula (3) by the data forwarding module in the first detector FSD1:

$$TX\_COM\_Frame\_ID = COM\_Frame\_ID - 1 \quad \text{Formula(3)}$$

where the COM_Frame_ID denotes the command frame address transmitted by the fire controller FSDCU, and the TX_COM_Frame_ID denotes the command frame address forwarded by the first detector FSD1.

That is address decrement is performed on the command frame address from the detector to calculate a new command frame address TX_COM_Frame_ID, and the new command frame address TX_COM_Frame_ID is transmitted to the port CAN#1 of the second detector FSD2 through the port CAN#0 of the first detector FSD1.

Similarly, the data forwarding module in the second detector FSD2 performs address decrement on the command frame address in accordance with the formula (3) to calculate a new command frame address, and then transmits this new command frame address to a next detector, by such analogy, until the port CAN#0 of the $n^{th}$ detector FSDn transmits the corresponding command frame address to the port CAN#1 of the fire controller FSDCU. The fire controller FSDCU selects to respond or not respond to the corresponding command frame address according to different values of the COM_Frame_ID.

With reference to FIG. 4, during the roll call command transmission, the process of transmitting a command to the detector FSD slave node by the CAN board adopts a command frame address decrement algorithm. The CAN board transmits a command frame via its port CAN#0, and the first detector FSD1 receives the command frame from the CAN board and forwards. During forwarding, the first detector FSD1 performs address decrement on the command frame address to calculate a new command frame address, and then transmits this new command frame address to a next detector FSD.

(2) The working process of the roll call command response is as follows.

Figure 5:
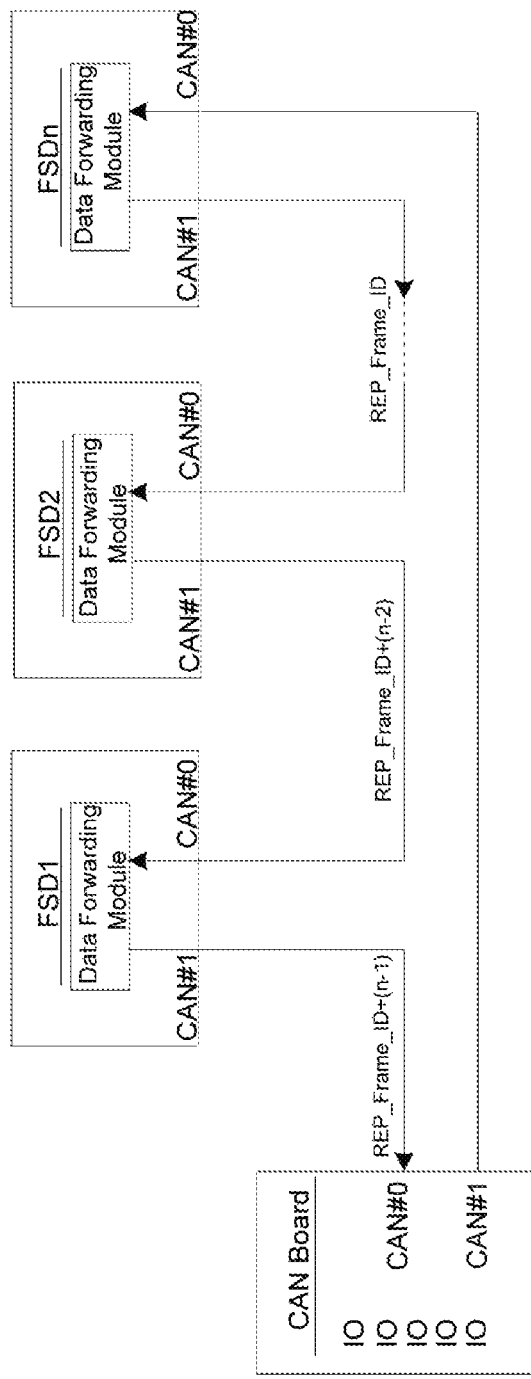
FIG. 5 is a schematic diagram of a roll call command response process by the CAN board, according to the present application.

Referring to FIG. 5, in the process of forwarding the command frame address of the roll call command, if the command frame address from the port CAN#1 of the $n^{th}$ detector FSDn conforms to the command frame address of the roll call command from the master node, the $n^{th}$ detector FSDn responds to the roll call command, and feeds back a slave command frame address in response to the command frame ID in accordance with the following formula (4), where the slave command frame ID is calculated by formula (4):

$$TX\_REP\_Frame\_ID = REP\_Frame\_ID + 1 \quad \text{Formula (4)}$$

where the REP_Frame_ID denotes the response frame ID that the port CAN#0 of the $n^{th}$ detector FSDn in response to the master node, and the TX_REP_Frame_ID denotes the response slave command frame address transmitted or forwarded to the fire controller FSDCU from the $n^{th}$ detector FSDn through its port CAN#1. In the roll call command response process, the command frame address of a slave node not conforming to the command frame address of the roll call command of the master node does not respond to the roll call command.

Referring to FIG. 5, during the roll call command response, the command frame address from the port CAN#1 of the $n^{th}$ detector FSDn conforms to the command frame address of the roll call command; and, only the $n^{th}$ detector FSDn responds to the roll call command, performs address increment on the slave command frame address while forwarding the response slave command frame of this node to calculate a new slave command frame address, and feeds this new slave command frame address back to a previous detection FSD.

The structure of the FSK board and the communication between the FSK board and the detectors are the same as the CAN board. In the two boards, the group command transmission and response and the roll call command transmission and response form a CAN communication loop, respectively. Data reception and forwarding can be performed in two directions of the two loops. The two loops are equivalent to two CAN buses which are redundant to each other, so that the accuracy and reliability of communication are improved.

Meanwhile, in the present application, the CAN bus connections between a fire controller and its neighboring detectors and the CAN bus connections between adjacent detectors are set independently, a data forwarding module is provided inside each detector, and the received command frame address is modified and forwarded by the data forwarding module. The modification of the command frame address adopts a data logic operation, wherein the data logic operation is to increment or decrement the received command frame address. The frame address of each detector is distinguished by the frame address of a slave node subjected to the command frame address increment or decrement. By the feeding back of the response frame address, the master node automatically identifies the number of fire detectors, without separately encoding the address of each probe.

The invention claimed is:

1. A train smoke and fire alarm communication method based on independent modules combination and a 3U chassis structure, comprising the following steps:
   externally connecting a carriage number connector X4 of an IO (Input and Output) board to an address line to identify a carriage number, and invoking a detector configuration;
   acquiring, by detectors, temperature information and smoke concentration information in an ambient environment of each detector, and transmitting the acquired temperature information and smoke concentration information to a CPU (Central Processing Unit) board to be processed;
   by the CPU board, determining the acquired temperature information and smoke concentration information, outputting alarm information when the temperature or the smoke concentration exceeds a set threshold, and transmitting the alarm information to an HMI (Human Machine Interface) display screen in a cab via a train network;
   after the alarm, interrupting signals output between the 10 board and a train safety loop, and transmitting the alarm information to the HMI display screen in the cab, and lightening a red alarm indicator on the DISP board corresponding to the detector giving the alarm; and
   by a DS (Data Storage) board, collecting and storing the temperature information, the smoke concentration information and the alarm information;
   by an Enet (Ethernet) board, collecting the temperature information, the smoke concentration information and the alarm information, as well as communication state of each board and storing states, and connecting the information on a switch by an Ethernet; and, by a wireless board, uploading the information to a cloud server;

the detectors include CAN (Control Area Network) interface detectors or FSK (Frequency-shift Keying) interface detectors; and the detectors transmit the acquired temperature information and smoke concentration information to the CPU board through a CAN board or an FSK board, respectively, to be processed;

the communication mechanism between the detectors and the CAN board or the FSK board is a group transmission-response mechanism, and the group command transmission-response mechanism comprises two processes, that is, group command transmission and group command response;

the process of transmitting a group command from the CAN board to the detectors FSD (Fire Smoke Detector) adopts a command frame address increment algorithm; the CAN board transmits a command frame via its port CAN#0, and a first detector FSD1 receives the command frame from the CAN board and forwards; when forwarding, the first detector FSD1 performs address increment processing on the command frame address to calculate a new command frame address, and transmits the new command frame address to a next detector FSD;

in the group command response process, the nth detector FSDn transmits and forwards a response slave command frame address of the detector at this node via its port CAN#1, and receives response frame IDs from other detectors via its port CAN#0; when forwarding the response slave command frame address of the detector at this node, the nth detector FSDn performs address increment processing on the slave command frame address to calculates a new slave command frame address, and transmits the new slave command frame address to a previous detector FSD.

2. The train smoke and fire alarm communication method according to claim 1, wherein, the communication mechanism between the detectors and the CAN board or the FSK board is a roll call-response mechanism; the roll call-response mechanism comprises two processes, that is, roll call command transmission and roll call command response;

the process of transmitting a command from the CAN board to the detectors FSD, namely slave nodes, adopts a command frame address decrement algorithm; the CAN board transmits a command frame via its port CAN#0, and a first detector FSD1 receives the command frame from the CAN board and forwards; when forwarding, the first detector FSD1 performs address decrement processing on the command frame address to calculate a new command frame address, and transmits the new command frame address to a next detector FSD;

during the roll call command response, a command frame address of a port CAN#1 of a $n^{th}$ detector FSDn conforms to a command frame address of a roll call command, and only the $n^{th}$ detector FSDn responds to the roll call command; when forwarding a response slave command frame at this node, the $n^{th}$ detector FSDn performs address increment processing on the slave command frame address to calculate a new slave command frame address and feeds the new slave command frame address back to a previous detector FSD.

3. The train smoke and fire alarm communication method according to claim 1, wherein, a smoke and fire alarm device used in the communication method comprises a power supply board, an IO board, a CPU board, a CAN board, a FSK board, a DS board, a DISP board, an Enet board, a liquid crystal touch screen and a wireless board; the boards are communicated with each other through a backplane bus.

4. The train smoke and fire alarm communication method according to claim 1, wherein, the CAN board and the detectors FSD are all provided with a port CAN#0 and a port CAN#1, and both the port CAN#0 and the port CAN#1 have a function of receiving and transmitting a frame address; the port CAN#0 of the CAN board is connected to the port CAN#1 of a first detector FSD1; the port CAN#0 of the first detector FSD1 is connected to the port CAN#1 of a next detector FSD; the port CAN#0 of the next detector FSD is connected to the port CAN#1 of a $n^{th}$ detector FSDn; and the port CAN#0 of the $n^{th}$ detector FSDn is connected to the port CAN#1 of the CAN board; the connections between the CAN board and its neighboring detectors FSD and the connections between adjacent detectors FSD are realized by independent CAN buses; a data forwarding module is provided inside each detector FSD; the data forwarding module modifies and forwards a received command frame address.

5. The train smoke and fire alarm communication method according to claim 2, wherein, a smoke and fire alarm device used in the communication method comprises a power supply board, an IO board, a CPU board, a CAN board, a FSK board, a DS board, a DISP board, an Enet board, a liquid crystal touch screen and a wireless board; the boards are communicated with each other through a backplane bus.

6. The train smoke and fire alarm communication method according to claim 2, wherein, the CAN board and the detectors FSD are all provided with a port CAN#0 and a port CAN#1, and both the port CAN#0 and the port CAN#1 have a function of receiving and transmitting a frame address; the port CAN#0 of the CAN board is connected to the port CAN#1 of a first detector FSD1; the port CAN#0 of the first detector FSD1 is connected to the port CAN#1 of a next detector FSD; the port CAN#0 of the next detector FSD is connected to the port CAN#1 of a $n^{th}$ detector FSDn; and the port CAN#0 of the $n^{th}$ detector FSDn is connected to the port CAN#1 of the CAN board; the connections between the CAN board and its neighboring detectors FSD and the connections between adjacent detectors FSD are realized by independent CAN buses; a data forwarding module is provided inside each detector FSD; the data forwarding module modifies and forwards a received command frame address.

* * * * *